US010397023B2

(12) United States Patent
Yang et al.

(10) Patent No.: US 10,397,023 B2
(45) Date of Patent: Aug. 27, 2019

(54) PACKET FORWARDING

(71) Applicant: HEWLETT PACKARD ENTERPRISE DEVELOPMENT, Houston, TX (US)

(72) Inventors: Xiaopeng Yang, Beijing (CN); Yubing Song, Beijing (CN); Ruichang Gao, Beijing (CN); Shilin Zhang, Beijing (CN)

(73) Assignee: Hewlett Packard Enterprise Development LP, Houston, TX (US)

(*) Notice: Subject to any disclaimer, the term of this patent is extended or adjusted under 35 U.S.C. 154(b) by 553 days.

(21) Appl. No.: 14/899,807

(22) PCT Filed: Aug. 1, 2014

(86) PCT No.: PCT/CN2014/083563
§ 371 (c)(1),
(2) Date: Dec. 18, 2015

(87) PCT Pub. No.: WO2015/014316
PCT Pub. Date: Feb. 5, 2015

(65) Prior Publication Data
US 2016/0149725 A1 May 26, 2016

(30) Foreign Application Priority Data
Aug. 2, 2013 (CN) .......................... 2013 1 0334016

(51) Int. Cl.
H04L 12/46 (2006.01)
H04L 12/24 (2006.01)
(Continued)

(52) U.S. Cl.
CPC ...... H04L 12/4666 (2013.01); H04L 12/4633 (2013.01); H04L 12/4641 (2013.01);
(Continued)

(58) Field of Classification Search
CPC ............. H04L 12/4633; H04L 12/4641; H04L 12/4666; H04L 61/103; H04L 45/745; H04L 49/3009; H04L 41/0668
See application file for complete search history.

(56) References Cited

U.S. PATENT DOCUMENTS

2012/0127854 A1* 5/2012 Khetan ............... H04L 12/4641
370/218
2012/0281700 A1* 11/2012 Koganti .................. H04L 45/02
370/392
(Continued)

FOREIGN PATENT DOCUMENTS

CN 102143068 8/2011
CN 102185782 9/2011
(Continued)

OTHER PUBLICATIONS

International Search Report and Written Opinion dated Oct. 29, 2014, PCT Patent Application No. PCT/CN2014/083563 dated Aug. 1, 2014 (ISA/CN).
(Continued)

Primary Examiner — Mandish K Randhawa

(57) ABSTRACT

A gateway RB may search for an ARP entry of the destination IP address of an IP packet. The gateway RB may generate an Ethernet header based on a VLAN identification and a MAC address in the found ARP entry and a first local MAC address. The gateway RB may generate an Ethernet packet by adding the generated Ethernet header to the IP packet, and send out the Ethernet packet via an egress port in the found ARP entry; wherein the founded ARP entry is generated by the gateway RB based on a received TRILL-encapsulated ARP packet and a VSI on the gateway RB associating with the first local MAC address and the destination IP address of the IP packet belong to the same VLAN.

8 Claims, 3 Drawing Sheets

(51) Int. Cl.
    *H04L 12/741*    (2013.01)
    *H04L 12/935*    (2013.01)
    *H04L 29/12*     (2006.01)
(52) U.S. Cl.
    CPC ........ *H04L 41/0668* (2013.01); *H04L 45/745* (2013.01); *H04L 49/3009* (2013.01); *H04L 61/103* (2013.01)

(56) References Cited

U.S. PATENT DOCUMENTS

| | | |
|---|---|---|
| 2012/0327836 A1 | 12/2012 | Narayanasamy |
| 2013/0003738 A1 | 5/2013 | Koganti et al. |
| 2013/0138832 A1 | 5/2013 | Qi et al. |
| 2013/0170339 A1 | 7/2013 | Kamath et al. |

FOREIGN PATENT DOCUMENTS

| | | |
|---|---|---|
| CN | 102032254 | 2/2013 |
| CN | 102970226 | 3/2013 |
| CN | 103200069 A | 7/2013 |
| CN | 103227757 | 7/2013 |

OTHER PUBLICATIONS

Zhang, M. et al, "VLAN Load Balancing"; Internet Engineering Task Force, Internet Society, Jul. 22, 2011.

* cited by examiner

US 10,397,023 B2

PACKET FORWARDING

CLAIM FOR PRIORITY

The present application is a national stage filing under 35 U.S.C. § 371 of PCT application number PCT/CN2014/083563, having an international filing date of Aug. 1, 2014, which claims priority to Chinese patent application number 201310334016.1, having a filing date of Aug. 2, 2013, the disclosures of which are hereby incorporated by reference in their entireties.

BACKGROUND

Very large layer 2 (VLL2) networking technology has been implemented in data center (DC) networks. VLL2 networking technologies such as the transparent interconnection of lots of links (TRILL) and the shortest path bridging (SPB) have been developed and have been standardized by different standards organizations. TRILL protocol is a layer-two network technology defined by Internet Engineering Task Force (IETF). The TRILL protocol introduces Intermediate System-to-Intermediate System (IS-IS) adopting layer-three routing technology into a layer-two network. Accordingly, the simplicity and flexibility of layer-two network may be combined with the stability, extensibility and high-performance of layer-three network.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" , means includes but not limited to, the term "including" means including but not limited to. The term "based on" means based at least in part on.

Figure 1:
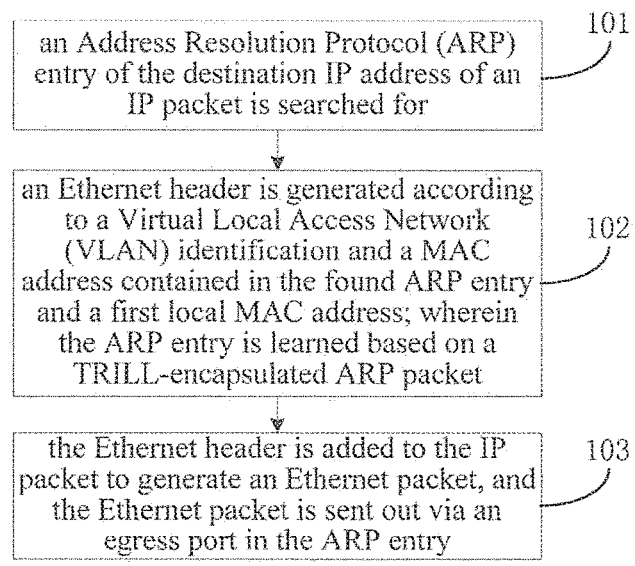
FIG. 1 is a flowchart illustrating a packet forwarding method according to an example of the present disclosure.

FIG. 1 is a flowchart illustrating a packet forwarding method according to an example of the present disclosure. The packet forwarding method includes following blocks.

At block 101, an Address Resolution Protocol (ARP) entry of the destination IP address of an IP packet is searched for.

At block 102, an Ethernet header is generated according to a Virtual Local Access Network (VLAN) identification and a MAC address contained in the found ARP entry and a first local MAC address; wherein the ARP entry is learned based on a TRILL-encapsulated ARP packet. The TRILL-encapsulated ARP packet is a TRILL-encapsulated ARP request packet or a TRILL-encapsulated ARP response packet.

At block 103, the Ethernet header is added to the IP packet to generate an Ethernet packet, and the Ethernet packet is sent out via an egress port in the ARP entry. A Virtual Switching Interface (VSI) associated with the first local MAC address and the destination IP address of the IP packet belong to the same VLAN.

According to the packet forwarding method shown in FIG. 1, a gateway Routing Bridges (RBs) in a TRILL network are unnecessary to encapsulate a packet into a TRILL packet after performing downstream layer-three forwarding.

Figure 2:
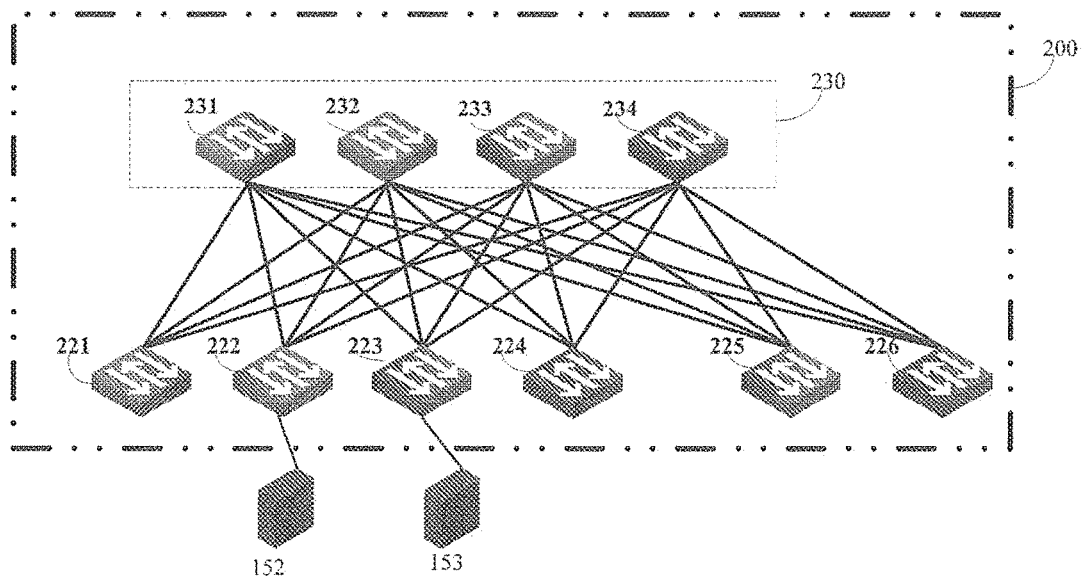
FIG. 2 is a diagram illustrating a layer-two network in a data center according to an example of the present disclosure.

FIG. 2 is a diagram illustrating a TRILL network in a data center according to an example of the present disclosure.

As shown in FIG. 2, a TRILL network 200 includes gateway RBs 231-234 and non-gateway RBs 221-226. Each of the gateway RBs 231-234 has a layer-three forwarding capability.

A virtual router 230 is composed of RBs 231-234. For a VLAN1 in the TRILL network 200, the virtual router 230 is as signed a virtual IP1 and a virtual MAC1, which are used as the IP address and MAC address of a gateway of the VLAN1 respectively. For a VLAN2 in the TRILL network 200, the virtual router 230 is assigned a virtual IP2 and a virtual MAC2, which are used as the IP address and MAC address of a gateway of the VLAN2. The RBs 231-234 may construct the virtual router 230 according to Hot Standby Router Protocol (HSRP) or Virtual Router Redundancy Protocol (VRRP). The RB 231 may be elected as a primary device of the virtual router 230. The RB 231 may send an Address Resolution Protocol (ARP) response packet corresponding to an ARP request packet for the IP address of the gateway of the VLAN1 or the IP address of the gateway of the VLAN2.

The RBs 231-234 all keep on an active state and are used as gateways of the VLAN1 and the VLAN2.

The IP address of a gateway of an end-station belonging to the VLAN1 is set as the virtual IP1, and the IP address of a gateway of an end-station belonging to the VLAN2 is set as the virtual IP2.

Each of the RBs 231-234 advertises the gateway information of the VLAN1 and the gateway information of the VLAN2 in the TRILL network 200. The gateway information advertised by each of the RBs 231-234 may include information for indicating the MAC addresses of the gateways and information for indicating the current RB to be used as the gateway. Accordingly, all RBs in the TRILL network 200 may learn that virtual MAC1 is gateway MAC addresses of the VLAN1, the virtual MAC2 is gateway MAC addresses of the VLAN2 are the virtual MAC2, and the gateway of the VLAN1 and the gateway of the VLAN2 are implemented by the RBs 231-234. Methods for advertising the gateway information by each of the RBs 231-234 are not limited in the present disclosure. In an example, each of the RBs 231-234 may send a conventional protocol packet in the TRILL network 200 through a TRILL multicast tree, and the gateway information may be contained in an undefined field of the conventional protocol packet. In another example, each of the RBs 231-234 may send a self-defined gateway advertisement message in the TRILL network 200 through the TRILL multicast tree, and the gateway information may be contained in the gateway advertisement message. Accordingly, it should be ensured that the protocol type of the self-defined gateway advertisement message can be recognized by all RBs in the TRILL network 200.

The RB 221 calculates TRILL paths from the RB 221 to the gateway (including the RBs 231-234) of the VLAN1 according to the topology of the TRILL network 200. Then, in a specific example corresponding to the method of block 101 of FIG. 1, the RB 221 selects TRILL paths with the smallest number of hops as Equal-Cost Multipath Routings (ECMPs) to the gateways of the VLAN1.

In FIG. 2, the ECMPs selected by the RB 221 to the gateways of the VLAN1 include a path from the RB 221 to the RB 231, a path from the RB 221 to the RB 232, a path from the RB 221 to the RB 233 and a path from the RB 221 to the RB 234. The ECMPs selected by the RB 221 to the gateways of the VLAN2 are the same as the ECMPs to the gateway of the VLAN1.

The RBs 222-226 may select ECMPs to the gateways of the VLAN1 and ECMPs to the gateways of the VLAN2 based on the same principle.

An end-station 152 belonging to the VLAN1 is connected to the RB 222, and an end-station 153 belonging to the VLAN2 is connected to the RB 223.

If the end-station 152 does not find a MAC address corresponding to the virtual IP1, the end-station 152 generates an ARP request packet for the virtual IP1. In the ARP request packet, a target IP address is the virtual IP1, a sender IP address is IP152, a sender MAC address is MAC152, a source MAC address is MAC152, and a destination MAC address is an all F MAC address, i.e. the destination MAC address is a broadcast address. The end-station 152 sends out the ARP request packet for the virtual IP1.

The RB 222 receives the ARP request packet from the end-station 152, and learns a MAC address entry based on the VLAN1, MAC152 (the source MAC address) and a port receiving the APR request packet. The RB 222 encapsulates the ARP request packet into a TRILL-encapsulated ARP request packet. In the TRILL-encapsulated ARP request packet, the ingress nickname and egress nickname of a TRILL header are nickname222 (the nickname of the RB222) and the nickname of the root of a distribution tree respectively. The distribution tree for sending the ARP request packet has been specified by the egress nickname. The source MAC address and destination MAC address of an outer Ethernet header of the TRILL-encapsulated ARP request packet are the MAC address of a TRILL interface of the RB 222 and an All-RBridges multicast address respectively.

The RBs 221 and 223-226 receive the TRILL-encapsulated ARP request packet, and learn a MAC address entry based on nickname222, the VLAN1 and MAC152(the inner source MAC address). The RBs 221 and 223-226 remove the outer Ethernet header and the TRILL header, and broadcast the ARP request packet via a port associated with the VLAN1.

The RBs 231-234 receive the TRILL-encapsulated ARP request packet, learn MAC address entry based on nickname222, the VLAN1 (the inner VLAN ID)and MAC152, and learn an ARP entry of IP152 based on a port receiving the TRILL-encapsulated ARP request packet, MAC152 (the sender MAC address), the VLAN1 and IP152 (the sender IP address).

The RB 231 generates an ARP response packet for the virtual IP1 which is requested by the received ARP request packet. In the ARP response packet, a target IP address is IP152, a target MAC address is MAC152, a sender IP address is the virtual IP1, a sender MAC address is the virtual MAC1, a source MAC address is MAC2312 and a destination MAC address is MAC152. The RB 231 sets a second MAC address MAC2312 of a Virtual Switching Interface (VSI) of the VLAN1 on the RB 231 as the source MAC address of the ARP response packet, rather than sets the virtual MAC1 as the source MAC address of the ARP response packet. In this way, other RBs may not learn an entry of the virtual MAC1 based on the source MAC address in the received ARP response packet, i.e., the MAC address entry of the gateways of the VLAN1.

The RB 231 encapsulates the ARP response packet into a TRILL-encapsulated ARP response packet based on the learned entry of MAC152. In the TRILL-encapsulated ARP response packet, an ingress nickname is nickname231, an egress nickname is nickname222, and the outer source MAC address and outer destination MAC address of an outer Ethernet header are the MAC address of a TRILL interface of the RB 231 and the MAC address of a TRILL interface of the next-hop RB respectively. In the TRILL network 200, the outer source MAC address and outer destination MAC address of a unicast TRILL packet are modified hop by hop. The outer source MAC address and outer destination MAC address of the unicast TRILL packet denote each-hop RB sending the unicast TRILL packet and the next-hop RB to the egress nickname. In FIG. 2, the RB 231 sends the TRILL-encapsulated ARP response packet to the RB 222.

The RB 222 receives the TRILL-encapsulated ARP response packet, determines that the outer destination MAC address and the egress nickname are the MAC address of a TRILL interface of the RB 222 and the nickname of the RB 222 respectively, removes the outer Ethernet header and the TRILL header, finds an entry matching the destination MAC address MAC152 in a MAC address table, and sends the ARP response packet to the end-station 152.

The end-station 152 receives the ARP response packet, learns an ARP entry of the virtual IP1, Based on the ARP entry of the virtual IP1 the end-station 152 encapsulates the IP packet whose destination IP address is IP153 into an Ethernet packet whose destination MAC address is the virtual MAC1 and sends out the encapsulated Ethernet packet. That is, in the Ethernet packet sent by the end-station 152, the destination MAC address is the virtual MAC1, and the source MAC address is MAC152.

The RB 222 receives the Ethernet packet whose destination MAC address is the virtual MAC1 from the end-station 152 and replaces the source MAC address with MAC222. This is a specific example of the method block 102 of FIG. 2 where a MAC address of the gateway is replaced with a local MAC address. The RB 222 then selects a path and sends the Ethernet packet via the selected path as explained above in method block 103 of FIG. 2. For example, the RB may select a path from the RB 222 to the RB 233, from ECMPs to the gateway of the VLAN1, and sends the Ethernet packet whose source MAC address has been replaced to the RB 233. In this way, in the TRILL network, the Ethernet packet of which destination is MAC address of VLAN1 gateway is sent to the VLAN1 gateway via one of ECMPs without being encapsulated into a TRILL packet. The VLAN1 gateway is implemented by the gateway RBs 231-234. As the Ethernet packet is not encapsulated in a TRILL packet before sending to the VLAN1 gateway, the gateway RBs 231-234 may not have to implement TRILL decapsulating before layer-three forwarding when they receive the Ethernet packet whose destination MAC address is MAC address of a gateway. The MAC address of the VSI of the VLAN1 on the RB 222 is MAC222, and is a local MAC address assigned to the RB 222.

In FIG. 2, on the RB 222 and other non-gateway RBs, the VSI of the VLAN1 and the VSI of the VLAN2 have different IP addresses, but have the same MAC address or have different MAC addresses.

The RB 222 may calculate a HASH value according to a five-tuple of the received Ethernet packet, select a path corresponding to the HASH value from the ECMPs, and send the Ethernet packet to the RB 233 via the selected path. The RB 222 modifies the source MAC address of the Ethernet packet to prevent the RBs 231-233 from modifying the egress nickname nickname222 in the learned entry of MAC152. Thus the learned entry of MAC 152 in the RB 231-233 will not be modified frequently.

The RB 233 receives the Ethernet packet whose destination MAC address is the virtual MAC1, and learns an entry of the source MAC address MAC222.

The RB 233 removes the Ethernet header whose destination MAC address is the virtual MAC1, and determines to perform downstream layer-three forwarding according to the destination IP address IP153. If the RB 233 does not find an ARP entry corresponding to the destination IP address IP153, the RB 233 caches the IP packet whose destination IP address is IP153, and generates an ARP request packet for requesting a MAC address associate with the IP address IP153. In the ARP request packet, the sender IP address is IP2332, the sender MAC address is MAC2331, the target IP address is IP153, the source MAC address is MAC2331, the destination MAC address is an all F MAC address, and the VLAN ID is VLAN2.

In FIG. 2, the VSI of the VLAN1 and the VSI of the VLAN2 on the gateway RB 233 have different IP2331 and IP2332 respectively, but the two VSIs on the gateway RB 233 have the same first MAC address MAC2331 and the same second MAC address MAC2332. In another example, the VSI of the VLAN1 and the VSI of the VLAN2 on the gateway RB 233 and other gateway RBs different IP addresses, have different first MAC addresses and different second MAC addresses. When one of the gateway RBs is elected as a master device of the virtual router, the gateway RB being the master device may set the second MAC addresses of its VSIs as source MAC addresses in ARP response packets for responding gateway MAC addresses.

The RB 233 sets the first MAC address MAC2331 of the VSI of the VLAN2 on the RB 233 as the source MAC address and the sender MAC address of the ARP request packet which requests the MAC address associate with the IP address IP153, and sets the IP address of the VSI of the VLAN2 on the RB 233 as the sender IP address of the ARP request packet. In this way, other RBs may not learn the entry of the virtual MAC2(i.e. the MAC address of VLAN2 gateway) based on the source MAC address of the received ARP request packet, an end-station from may not learn the ARP entry of gateways based on the sender IP address and sender MAC address of the ARP request packet. Accordingly, the RB 233 does not set the virtual MAC2 as the source MAC address and sender MAC address of the ARP request packet, and also does not set the virtual IP2 as the target IP address of the ARP request packet. Only the RB 231 may respond gateway MAC address for the ARP request packet requesting for the IP address of each gateway.

The RB 233 encapsulates the ARP request packet into a TRILL-encapsulated ARP request packet. In the TRILL-encapsulated ARP request packet, the ingress nickname and the egress nickname are nickname233 and the nickname of the root of the distribution tree respectively, and the outer source MAC address and the outer destination MAC address are the MAC address of a TRILL interface of the RB 233 and an All-RBridges multicast address of the RB 233 respectively.

The RBs 221-226 receive the TRILL-encapsulated ARP request packet, and learn the MAC address entry based on nickname233, the VLAN2 and MAC2331. The RBs 221-226 remove the outer Ethernet header and the TRILL header, and broadcast the ARP request packet via a port associated with the VLAN2.

The end-station 153 receives the ARP request packet, learns an ARP entry of IP2332, generates an ARP response packet for the ARP request packet for IP153, and sends out the ARP response packet according to the ARP entry of IP2332. In the ARP response packet generated by the end-station 153, the sender IP address and the sender MAC address are IP153 and MAC153 respectively, the target IP address and the target MAC address are IP2332 and MAC2331 respectively, and the source MAC address and the destination MAC address are MAC153 and MAC2331 respectively.

The RB 223 receives the ARP response packet, and learns a MAC address entry based on the VLAN2, the source MAC address MAC153 and a port receiving the ARP response packet.

After finding an MAC address entry matching the destination MAC address MAC2331, the RB 223 encapsulates the ARP response packet into a TRILL-encapsulated ARP response packet. In the TRILL-encapsulated ARP response packet, the ingress nickname and egress nickname of the TRILL header are nickname223 and nickname233 respectively, the outer source MAC address and the outer destination MAC address are the MAC address of the TRILL interface of the RB 223 and the MAC address of the TRILL interface of the RB 233.

Accordingly, the destination MAC address, source MAC address and VLAN ID of the Ethernet header in the ARP response packet are an inner destination MAC address, an inner source MAC address and an inner VLAN ID in the TRILL-encapsulated ARP response packet. The RB 223 sends the TRILL-encapsulated ARP response packet to the RB 233.

The RB 223 sends the TRILL-encapsulated ARP response packet to the RB 233 according to the outer destination MAC address.

The RB 233 receives the TRILL-encapsulated ARP response packet, learns a MAC address entry based on nickname223, the inner source MAC address and the inner VLAN ID, and learns the ARP entry of IP153 based on the port receiving the TRILL-encapsulated ARP response packet, the inner VLAN ID, the sender IP address IP153 and the sender MAC address MAC153.

The RB 233 encapsulates an IP packet whose destination IP address is IP153 into an Ethernet packet based on MAC2331, MAC153 and the VLAN2 in the ARP entry of the destination IP address IP153, and sends out the Ethernet packet via an egress port in the ARP entry of the destination IP address IP153. When performing downstream layer-three forwarding, the RB 233 encapsulates the IP packet into the Ethernet packet and sends out the Ethernet packet without implementing TRILL encapsulating.

Since the RB 223 sends the TRILL-encapsulated ARP response packet to the RB 233 via a unicast path in the TRILL network 200, the RB 233 receives the TRILL-encapsulated ARP response packet from a port on a TRILL path which is the shortest path. Therefore, when the RB 233 sends out the Ethernet packet via the egress port in the ARP entry of the destination IP address IP153, the Ethernet packet is to be forwarded via the shortest path.

The RB 223 receives the Ethernet packet whose destination MAC address is MAC153, finds an entry matching MAC153, and sends the Ethernet packet to the end-station 153.

When the RBs 231-234 receive the Ethernet packet/IP packet from the outer network of the data center and determines to perform downstream layer-three forwarding according to the destination IP address, the IP packet may be encapsulated into an Ethernet packet according to the above mentioned method and the Ethernet packet is sent out.

Abnormality processing will be described hereinafter.

The RBs 221-226 check uplinks which connect the RBs 221-226 with the gateway RBs 231-234. The RB 223 detects a failed uplink, and the failed uplink is located on a path between the RB 223 and the RB 233. The path between the RB 223 and the RB 233 is one of the ECMPs from the RB 223 to the VLAN1 gateway and the VLAN2 gateway. The RB 223 deletes the path where the failed uplink is located from the ECMPs to the VLAN1 gateway and the VLAN2 gateway.

The RBs 231-234 check uplinks which connect the outer network and downlinks which connect RBs 231-234 with the RBs 221-226. The RB 233 detects a failed downlink, and deletes an ARP entry associated with a physical port on the failed downlink. In this example, the RB 233 deletes the ARP entry of IP153.

When the destination IP address of the Ethernet packet received by the RB 233 is IP153, the RB 233 generates an ARP request packet for IP153, and encapsulates the ARP request packet into the TRILL-encapsulated ARP request packet.

The RBs 221-226 receive the TRILL-encapsulated ARP request packet, remove the outer Ethernet header and the TRILL header, and broadcast the ARP request packet via a port associated with the VLAN2.

The end-station 153 receives the ARP request packet, finds the ARP entry of IP2332, generates an ARP response packet for the ARP request packet for IP153, and sends out the ARP response packet according to the ARP entry of IP2332.

The RB 223 receives the ARP response packet, finds the MAC address entry matching the destination MAC address MAC2331, and encapsulates the ARP response packet into the TRILL-encapsulated ARP response packet. In the TRILL-encapsulated ARP response packet, the ingress nickname and egress nickname of the TRILL header are nickname223 and nickname233 respectively, the source MAC address and destination MAC address of the outer Ethernet header are the MAC address of the TRILL interface of the RB 223 and the MAC address of the TRILL interface of the RB 232 respectively.

The RB 223 sends the TRILL-encapsulated ARP response packet to the next-hop RB 232. The RB 232 receives the RILL-encapsulated ARP response packet, learns the MAC address entry associated with MAC153 based on nickname223, the inner VLAN ID and the inner source MAC address, modifies the outer source MAC address and the outer destination MAC address based on egress nickname233, and sends the TRILL-encapsulated ARP response packet to the next-hop RB 222.

The RB 222 receives the TRILL-encapsulated ARP response packet, learns the MAC address entry associated with MAC153 based on nickname223, the inner VLAN ID and the inner source MAC address, and sends the TRILL-encapsulated ARP response packet to the next-hop RB 233.

The RB 233 receives the TRILL-encapsulated ARP response packet, learns the MAC address entry associated with MAC153 based on nickname223, the inner VLAN ID and the inner source MAC address, and learns the ARP entry of IP153 based on the port receiving the TRILL-encapsulated ARP response packet, the inner VLAN ID, the sender IP address IP153 and the sender MAC address MAC153.

The RB 233 generates an Ethernet header based on MAC2331 and the ARP entry of the destination IP address IP153. In the Ethernet header, the source MAC address is MAC2331, the destination MAC address is MAC153, and the VLAN ID is the VLAN2. The RB 233 adds the Ethernet header to the IP packet whose destination IP address is IP153 to generate an Ethernet packet, and sends out the Ethernet packet via an egress port in the ARP entry of the destination IP address IP153.

The RB 223 sends the Ethernet packet whose destination MAC address is MAC153 to the RB 222. In this way, when the RB 223 performs downstream layer-three forwarding, what is sent is an Ethernet packet instead of a TRILL packet.

For a network apparatus whose forwarding chip may not possess sufficient processing capacity, it cannot perform layer-3 forwarding immediately after TRILL decapsulation. When such network apparatus is used the gateway RBs, it has to send Ethernet unicast frame decapsulated from TRILL packet to its loopback-interfaces first, and then performs layer-3 forwarding based on the Ethernet unicast frame which received at its loopback-interfaces. However, available user interfaces on such network apparatus are reduced due to some of the user interfaces are configured as loopback-interfaces, layer-3 forwarding capacity of such network apparatus might be restricted by the number of the loopback-interfaces.

In above examples, non-gateway RBs 221-226 calculate ECMPs towards gateway RBs 231-234 based on TRILL network topology, and transmit Ethernet unicast frames needed layer-3 forwarding to the gateway RBs through the ECMPs. The gateway RBs send out Ethernet packet after performing layer-three forwarding. Thus, the gateway RBs 231-234 don't have to implement TRILL decapsulation before performing layer-3 forwarding and TRILL encapsulation after performing layer-3 forwarding. The layer-3 forwarding capacity of the gateway RBs 231-234 may not be affected.

The RB 222 receives the Ethernet packet whose destination MAC address is MAC153, finds an entry matching MAC153 in a MAC table, and encapsulates the Ethernet packet into the TRILL-encapsulated Ethernet packet based on the entry matching MAC153. In the TRILL-encapsulated Ethernet packet, the ingress nickname and egress nickname of the TRILL header are nickname222 and nickname223 respectively, the outer source MAC address and the outer destination MAC address are the MAC address of the TRILL interface of the RB 222 and the MAC address of the TRILL interface of the RB 232. The RB 222 sends the TRILL-encapsulated Ethernet packet to the next-hop RB 232.

The RB 232 receives the TRILL-encapsulated Ethernet packet, replaces the outer source MAC address and the outer destination MAC with the MAC address of the TRILL interface of the RB 232 and the MAC address of the TRILL interface of the RB 223 respectively, and sends the TRILL-encapsulated Ethernet packet to the next-hop RB 223.

The RB 223 receives the TRILL-encapsulated Ethernet packet, removes the outer Ethernet header and the TRILL header, finds the entry matching MAC153 in the MAC table, and sends the Ethernet packet to the end-station 153.

When the destination MAC address of the Ethernet packet received by the RBs 222 and 223 is not the MAC address of the gateway, routine layer-two forwarding processing is performed on the Ethernet packet.

The process of requesting for the virtual MAC2 corresponding to the virtual IP2 by the end-station 153 is the same as the process of requesting for the virtual MAC1 corresponding to the virtual IP1 by the end-station 152.

The RB 231 generates an ARP response packet for the ARP request packet for the virtual IP2, and sets the virtual MAC2 and MAC2312 as the sender MAC address and the source MAC address respectively.

Based on the learned ARP entry of the virtual IP2, the end-station 153 perform encapsulation and forwarding for an IP packet on which layer-three forwarding is to be performed. The RB 223 receives the Ethernet packet whose destination MAC address is the virtual MAC2, replaces the source MAC address with the MAC address MAC223 of the VSI of the VLAN2 on the RB 223, and selects a path from the RB 223 to the RB 232 to forward the Ethernet packet whose source MAC address has been replaced and whose destination MAC address is the MAC address of the gateway of the VLAN2. The selected path from the RB 223 to the RS232 is one of the ECMPs from the RB223 to the gateway RBs 231-234. Accordingly, the ECMPs may share in the sending of the Ethernet packet to the gateway of the VLAN2.

When detecting that all uplinks of the RB 233 are failed, the RB 233 advertises the information that all uplinks of the RB 233 are failed to other RBs in the TRILL network 200. The RB 221 deletes the path between the RB 221 and the RB 233 from the ECMPs to the VLAN1 gateway and the VLAN2 gateway. Each of the RBs 222-226 also performs the same processing, that is, deletes a path between the current RB and the RB 233 from the ECMPs.

In this example, an initial packet sent by a gateway RB through performing downstream layer-three forwarding is always an Ethernet packet. When the destination MAC address of an Ethernet packet received by a non-gateway RB is not the MAC address of the gateway, the Ethernet packet is performed according to a routine layer-two forwarding method.

Figure 3:
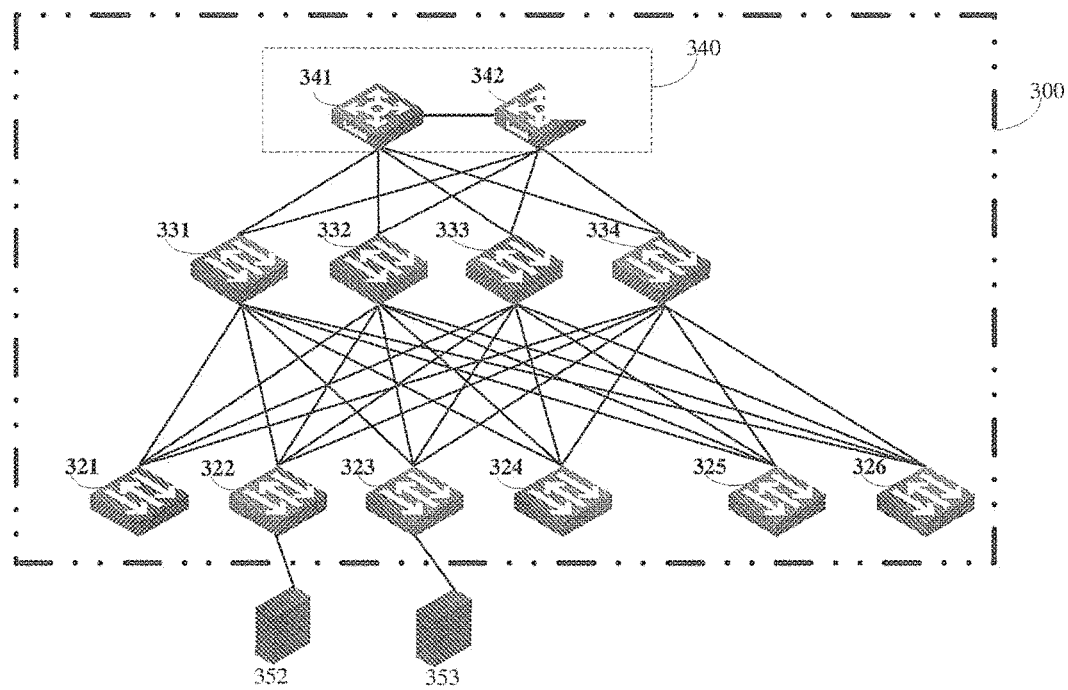
FIG. 3 is a diagram illustrating a layer-two network in a data center according to another example of the present disclosure.

FIG. 3 is a diagram illustrating a layer-two network in a data center according to another example of the present disclosure.

As shown in FIG. 3, a TRILL network 300 includes gateway RBs 341-342 and non-gateway RBs 331-334 and 321-326. Each of the gateway RBs 341-342 has a layer-three forwarding capability.

A virtual router 340 is composed of RBs 341-342. For a VLAN10 in the TRILL network 300, the virtual router 340 is assigned a virtual IP3 and a virtual MAC3, which are used as the IP address and MAC address of a gateway of the VLAN10 respectively. For a VLAN20 in the TRILL network 300, the virtual router 340 is assigned a virtual IP4 and a virtual MAC4, which are used as the IP address and MAC address of a gateway of the VLAN20.

The RBs 341-342 may construct the virtual router 340 according to the HSRP or the VRRP. The RB 341 may be elected as a primary device of the virtual router 340. The RB 341 may send an ARP response packet corresponding to an ARP request packet for the virtual IP3 or the virtual IP4. The RBs 341-342 both keep on an active state and are used as gateway of the VLAN10 and the VLAN20.

The IP address of a gateway of an end-station belonging to the VLAN10 is set as the virtual IP3, and the IP address of a gateway of an end-station belonging to the VLAN20 is set as the virtual IP4.

All RBs in the TRILL network 300 know that the gateway of the VLAN10 and the gateway of the VLAN20 are the virtual MAC3 and the virtual MAC4 respectively, and both the gateways of the VLAN10 and the gateway of the VLAN20 are the RBs 341 and 342.

Each of the RBs 341-342 advertises the gateway information of the VLAN10 and the gateway information of the VLAN20 in the TRILL network 300. The gateway information advertised by each of the RBs 341-342 may include information for indicating the MAC addresses of the gateways and information for indicating the current RB to be used as the gateway. Accordingly, all RBs in the TRILL network 300 may learn that the virtual MAC3 is gateway MAC address of the VLAN10, the virtual MAC4 is gateway MAC addresses of the VLAN20, and the gateway of the VLAN10 and the gateway of the VLAN20 are implemented by the RBs 341-342.

In an example, each of the RBs 341-342 may send a conventional protocol packet in the TRILL network 300 through a TRILL multicast tree, and the gateway information may be contained in an undefined field of the conventional protocol packet. In another example, each of the RBs 341-342 may send a self-defined gateway advertisement message in the TRILL network 300 through the TRILL multicast tree, and the gateway information may be contained in the gateway advertisement message. Accordingly, it should be ensured that the protocol type of the self-defined gateway advertisement message can be recognized by all RBs in the TRILL network 300.

The RB 321 calculates TRILL paths between the RB 321 and the gateway (including the RBs 341-342) of the VLAN10 according to the topology of the TRILL network 300, and selects TRILL paths with the smallest number of hops as ECMPs to the gateways of the VLAN10.

The RB 321 calculates TRILL paths between the RB 321 and the gateway of the VLAN20 according to the topology of the TRILL network 300, and selects TRILL paths with the smallest number of hops as ECMPs to the gateways of the VLAN20.

In FIG. 3, the ECMPs selected by the RB 321 to the gateways of the VLAN10 include four ECMPs between the RB 321 and the RB 341, and transiting RBs on the ECMPs are the RBs 331-334 respectively. The ECMPs selected by the RB 321 to the gateways of the VLAN10 further include four ECMPs between the RB 321 and the RB 342, and transiting RBs on the ECMPs are the RBs 331-334 respectively. The ECMPs selected by the RB 321 to the gateways of the VLAN20 are the same as the ECMPs to the gateways of the VLAN10.

The RBs 322-326 may select ECMPs to the gateways of the VLAN10 and ECMPs to the gateways of the VLAN20 based on the same principle.

In FIG. 3, the ECMPs selected by the RB 331 to the gateways of the VLAN10 and the ECMPs selected by the RB 331 to the gateways of the VLAN20 include a path between the RB 331 and the RB 341 and a path between the RB 331 and the RB 342.

An end-station 352 belonging to the VLAN10 is connected to the RB 322, and an end-station 353 belonging to the VLAN20 is connected to the RB 323.

If the end-station 352 does not find a MAC address corresponding to the virtual IP3, the end-station 352 generates an ARP request packet for the virtual IP3. In the ARP request packet, a target IP address is the virtual IP3, a sender IP address is IP352, a sender MAC address is MAC352, the source MAC address and destination MAC address of an Ethernet header of the ARP request packet are the MAC352 and an all F MAC address respectively. The end-station 352 sends out the ARP request packet for the virtual IP3 to the RB 322.

The RB 322 receives the ARP request packet from the end-station 352, and learns an entry of MAC352 based on the VLAN10, the source MAC address of the ARP request packet and a port receiving the APR request packet. The RB 322 encapsulates the ARP request packet into a TRILL-encapsulated ARP request packet, and broadcasts the TRILL-encapsulated ARP request packet in the TRILL network 300.

The RBs 321 and 323-326 receive the TRILL-encapsulated ARP request packet, learn the MAC address entry based on nickname322, the VLAN10 and MAC352. The RBs 321 and 323-326 remove the outer Ethernet header and the TRILL header, and broadcast the ARP request packet via a port associated with the VLAN10.

The RBs 331-341 being used as transiting RBs learn the MAC address entry of MAC352 based on the ingress nickname, the inner destination MAC address and the inner VLAN ID, and forward TRILL-encapsulated the ARP request packet based on the egress nickname in the TRILL network 300.

The RBs 341 and 342 receive the TRILL-encapsulated ARP request packet, learn the MAC address entry based on nickname322, the VLAN10 and MAC352, and learn an ARP entry of IP352 based on a port receiving the TRILL-encapsulated ARP request packet, MAC352 (the sender MAC address), an inner VLAN ID and IP352 (the sender IP address).

The RB 341 generates an ARP response packet for the ARP request packet. In the ARP response packet, a target IP address is IP352, a target MAC address is MAC352, a sender IP address is the virtual IP3, and a sender MAC address is the virtual MAC3. The RB 341 sets the source MAC address and destination MAC address of the Ethernet header in the ARP response packet as the second MAC address MAC3412 of the VSI of the VLAN10 on the RB 341 and MAC 352 respectively. The RB 341 encapsulates the ARP response packet into a TRILL-encapsulated ARP response packet.

In FIG. 3, the IP address of the VSI of the VLAN10 on the RB 341 and the IP address of the VSI of the VLAN20 on the RB 341 are IP3411 and IP3412 respectively, but the two VSIs have the same first MAC address MAC3411 and the same second MAC address MAC3412. The VSI of the VLAN10 on the gateway RB 342 and the VSI of the VLAN20 on the gateway RB 342 have different IP addresses, but have the same first MAC address and the same second MAC address. In another example, the two VSIs on the gateway RB 341 have different first MAC addresses and different second MAC addresses; the two VSIs on the gateway RB 342 have different first MAC addresses and different second MAC addresses.

The RB 341 sets the ingress nickname as nickname341, and sets egress nickname as nickname322 according to the learned MAC address entry, and sets the outer source MAC address and the outer destination MAC address as the MAC address of the TRILL interface of the RB 341 and the MAC address of the TRILL interface of the next-hop RB 332 respectively. In FIG. 3, the RB 341 sends the TRILL-encapsulated ARP response packet to the RB 332.

The RB 332 receives the TRILL-encapsulated ARP response packet, learns the MAC address entry of MAC3412 based on the ingress nickname, the inner destination MAC address and the inner VLAN ID, modifies the outer source MAC address and the outer destination MAC address, and sends the TRILL-encapsulated ARP response packet to the RB 322.

The RB 322 receives the TRILL-encapsulated ARP response packet, determines that the outer MAC address and the egress nickname are the MAC address and nickname of the TRILL interface of the RB 322 respectively, removes the outer Ethernet header and the TRILL header, finds an entry matching the destination MAC address MAC352 in a MAC table, and sends the ARP response packet to the end-station 352.

The end-station 352 receives the ARP response packet, learns an ARP entry of the virtual IP3, encapsulates an IP packet whose destination IP address is IP353 into a Ethernet packet whose destination MAC address is the virtual MAC3 based on the ARP entry of the virtual IP3, and sends out the Ethernet packet. That is, in the Ethernet packet sent by the end-station 352, the destination MAC address is the virtual MAC3, and the source MAC address is MAC352.

The RB 322 receives the Ethernet packet whose destination MAC address is the virtual MAC3 from the end-station 352, replaces the source MAC address with MAC322, selects a path, for example, the path the RB 322 ->RB 332 -> the RB 341, from ECMPs to the gateway of the VLAN10, and sends out the Ethernet packet whose source MAC address has been replaced. The RB 322 modifies the source MAC address to prevent the next-hop RB or the gateway from modifying the egress port in the learned entry of MAC352, that is, nickname322.

The RB 332 receives the Ethernet packet whose destination MAC address is the virtual MAC3, replaces the source MAC address with MAC332, selects a path, for example, the path from the RB 332 to the RB 341, from ECMPs to the gateways of the VLAN10, and sends out the Ethernet packet whose source MAC address has been replaced. The RB 332 modifies the source MAC address to prevent the gateway from modifying the egress port in the learned entry of MAC352.

In FIG. 3, on the non-gateway RBs 321-326 and 331-334, the VSIs of VLAN10 and the VSIs of the VLAN20 have different IP addresses, but have the same MAC address or have different MAC addresses.

In this way, the RBs 322 and 332 may utilize the ECMPs to the VLAN10 gateway to share in the sending of the Ethernet packet to the VLAN10 gateway. The RBs 322 and 333 do not need to encapsulate the Ethernet packet sent to the VLAN10 into the TRILL packet. Correspondingly, the gateway of the VLAN10 may perform layer-three forwarding without decapsulating the TRILL packet.

The RBs 322 and 332 may calculate a HASH value according to a five-tuple of the received Ethernet packet, and select a path corresponding to the HASH value from the ECMPs. The RB 341 receives the Ethernet packet whose destination MAC address is the virtual MAC3, and learns the MAC address entry of the source MAC address MAC332.

The RB 341 removes the Ethernet header of the Ethernet packet whose destination MAC address is the virtual MAC3, and determines to perform downstream layer-three forwarding on the IP packet whose destination IP address is IP353 according to the destination IP address IP353.

If the RB 341 does not find an ARP entry of the destination IP address IP353, the RB 341 caches the IP packet whose destination IP address is IP353, and generates an ARP request packet for IP353. In the ARP request packet, the sender IP address is the IP address IP3412 of the VSI of the VLAN20 on the RB 341, the sender MAC address is the first MAC address MAC3411 of the VSI of the VLAN20 on the RB 341, and the target IP address is IP352. The VLAN ID, source MAC address and destination MAC address of the Ethernet header in the ARP request packet are the VLAN20, MAC3411 and an all F MAC address respectively.

The RB 341 encapsulates the ARP request packet into a TRILL-encapsulated ARP request packet, and broadcasts the TRILL-encapsulated ARP request packet in the TRILL network 300.

The RBs 331-334 receive the TRILL-encapsulated ARP request packet, and learn the MAC address entry based on the ingress nickname, the VLAN20 and MAC3411. The RBs 331-334 forward the TRILL-encapsulated ARP request packet according to the egress nickname.

The RBs 321-326 receive the TRILL-encapsulated ARP request packet, and learn the MAC address entry based on the ingress nickname, the VLAN20 and MAC3411. The RBs 321-326 remove the outer Ethernet header and TRILL header of the TRILL-encapsulated ARP request packet, and broadcasts the ARP request packet via a port associated with the VLAN20.

The end-station 353 receives the ARP request packet, learns the ARP entry of IP3412, generates an ARP response packet corresponding to the ARP request packet for the IP353, and sends the ARP response packet according to the ARP entry of IP3412. In the ARP response packet generated by the end-station 353, the sender IP address and the sender MAC address are IP353 and MAC353 respectively, the target IP address and the target MAC address are IP3412 and MAC3411 respectively, and the source MAC address and the destination MAC address are MAC353 and MAC3411 respectively.

The RB 323 receives the ARP response packet, and learns the MAC address entry based on the VLAN 20, the source MAC address MAC353 and a port receiving the ARP response packet.

The RB 323 finds an entry matching the MAC address MAC3411, and encapsulates the ARP response packet into a TRILL-encapsulated ARP response packet. In the TRILL-encapsulated ARP response packet, the ingress nickname and egress nickname of the TRILL header are nickname323 and nickname341 respectively, the outer source MAC address and outer destination MAC address of the Ethernet header are the MAC address of the TRILL interface of the RB 323 and the MAC address of the TRILL interface of the next-hop RB 332. The RB 323 sends the TRILL-encapsulated ARP response packet to the next-hop RB 332 based on the outer destination MAC address.

The RB 332 receives the TRILL-encapsulated ARP response packet, learns the MAC address entry based on the ingress nickname323, MAC353 and the VLAN20, modifies the outer source MAC address and the outer destination MAC address, and sends the TRILL-encapsulated ARP response packet to the RB 341.

The RB 341 receives the TRILL-encapsulated ARP response packet, learns the MAC address entry based on the ingress nickname323, MAC353 and the VLAN20, and learns the ARP entry of IP353 based on a port receiving the TRILL-encapsulated ARP response packet, the VLAN20, IP353 and MAC353.

The RB 341 generates an Ethernet header based on MAC3411, MAC353 and the VLAN20, adds the Ethernet header to the IP packet whose destination IP address is IP353, and sends out the Ethernet packet via an egress port in the ARP entry of IP353. In this way, when the RB 341 performs downstream layer-three forwarding, what is sent is the Ethernet packet.

The RB 332 receives the Ethernet packet, finds an entry matching MAC353, encapsulates the Ethernet packet into a TRILL-encapsulated Ethernet packet, and sends the TRILL-encapsulated Ethernet packet to the RB 323.

The RB 323 receives the TRILL-encapsulated Ethernet packet, removes the outer Ethernet packet and the TRILL header, finds the entry matching MAC353, and sends the TRILL-encapsulated Ethernet packet to the RB 353.

Abnormality processing will be described hereinafter.

The RBs 321-326 and 331-334 check uplinks.

The RB 321 detects a failed uplink, and the failed uplink is located on a path the RB 321 -> the RB 332-> the RB 341 and a path the RB 321-> the RB 332 -> the RB 342. The RB 321 deletes the path where the failed uplink is located from the ECMPs towards the VLAN10 gateway and the VLAN20 gateway.

The RB 332 detects a failed uplink, and the failed uplink is located on a path between the RB 332 and the RB 341 which is one of the ECMPs from the RB 332 to the VLAN10 gateway and the VLAN20 gateway. The RB 332 deletes the path where the failed uplink is located from the ECMPs to the gateways of the VLAN10 and the VLAN20.

In the TRILL network 300 shown in FIG. 3, even if one gateway RB is used as the gateway of each VLAN in the TRILL network 300, the RBs 321-326 and RBs 331-334 may still utilize the ECMPs to the gateway of each VLAN to share in the sending of Ethernet packets to each VLAN.

Each of the RBs 341 and 342 checks its uplinks and downlinks. The RB 341 detects that a downlink connected to the RB 332 is failed, and deletes the ARP entry of IP353 associated with a physical port of the failed downlink.

When the destination IP address of the Ethernet packet received by the RB 341 is IP353, the RB 341 resends an ARP request packet for IP353, learns the ARP entry of IP353 again based on the received TRILL-encapsulated ARP response packet, encapsulates the IP packet whose destination IP address is IP353 into the Ethernet packet according to the learned ARP entry, and sends out the Ethernet packet.

A process of requesting for the MAC address of the gateway of the VLAN20 by the end-station 353 is the same as the process of requesting for the MAC address of the gateway of the VLAN10 by the end-station 352.

When detecting that all uplinks of the RB 341 are failed, the RB 341 advertises the information that all uplinks of the RB 341 are failed in the TRILL network 300. Each of the RBs 321-326 delete the path between the current RB and the RB 341 from the ECMPs to the VLAN10 and the VLAN20. Each of the RBs 331-334 also performs the same processing, that is, deletes a path between the current RB and the RB 341 from the ECMPs.

It can be seen from the examples shown in FIGS. 2 and 3 that, when a non-gateway RB in a data center receives an Ethernet packet whose destination MAC address is the MAC address of the gateway, the non-gateway RB replaces the source MAC address with a local MAC address, and forwards the Ethernet packet whose source MAC address has been replaced and whose destination MAC address is the gateway MAC address via the ECMPs to the gateway. In this way, the non-gateway RB may send to the gateway RB the Ethernet packet on which the layer-three forwarding is to be performed without encapsulating the Ethernet packet into the TRILL-encapsulated Ethernet packet.

Figure 4:
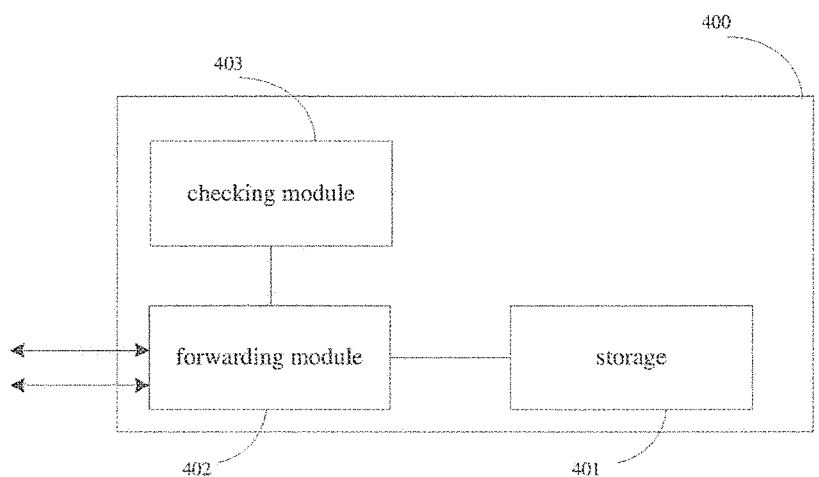
FIG. 4 is a diagram illustrating the structure of a packet forwarding apparatus according to an example of the present disclosure.

FIG. 4 is a diagram illustrating the structure of a packet forwarding apparatus according to an example of the present disclosure. The packet forwarding apparatus 400 is applied to a gateway RB in a TRILL network, and includes a storage 401 and a forwarding module 402.

The storage 401 may store learned ARP entries.

The forwarding module 402 may search for an ARP entry of the destination IP address of an IP packet in the ARP entries stored by the storage 401, and generate an Ethernet header according to a VLAN identification and a MAC address in the found ARP entry and a first local MAC address. The forwarding module 402 may generate an Ethernet packet by adding the Ethernet header to the IP packet, and send out the Ethernet packet via an egress port in the ARP entry. A VSI associated with the first local MAC address and the destination IP address of the IP packet belong to the same VLAN.

In an example, the forwarding module 402 may generate an ARP request packet for the destination IP address according to the local IP address and first local MAC address of the VSI in response to determination that the ARP entry of the destination IP address of the IP packet is not found. The forwarding module 402 may encapsulate the ARP request packet into a TRILL-encapsulated ARP request packet and broadcast the TRILL-encapsulated ARP request packet. The forwarding module 402 may receive a TRILL-encapsulated ARP response packet corresponding to the destination IP address, and learn the ARP entry of the destination IP address based on an inner VLAN ID, a sender MAC address, a sender IP address in the received TRILL-encapsulated ARP response packet and a receiving port of the received TRILL-encapsulated ARP response packet.

In an example, the forwarding module 402 may further receive a TRILL-encapsulated ARP request packet for the IP address of a gateway, and learn an ARP entry of a sender IP address based on an inner VLAN ID, a sender MAC address, the sender IP address in the received TRILL-encapsulated ARP request packet and a receiving port of the received TRILL-encapsulated ARP request packet. The forwarding module 402 may determine whether to respond to an ARP request packet for the MAC address of the gateway. The forwarding module 402 may generate an ARP response packet corresponding to the ARP request packet, and sets the source MAC address of the generated ARP response packet as a second local MAC address of the VSI in a response to a determination that to respond to the ARP request packet for the MAC address of the gateway. The forwarding module 402 encapsulates the generated ARP response packet into a TRILL-encapsulated ARP response packet and sends the TRILL-encapsulated ARP response packet to the next-hop RB.

In an example, the packet forwarding apparatus 400 further includes a checking module 403. The checking module 403 may check a downlink and an uplink, and notify the forwarding module 402 of a failed downlink or a failed uplink. The forwarding module 402 deletes, from the storage 401, an ARP entry in which a port of the failed downlink is used as an egress port. When determining that all uplinks are failed, the forwarding module 402 notifies other RBs in the TRILL network of that all uplinks of the gateway RB are failed.

Figure 5:
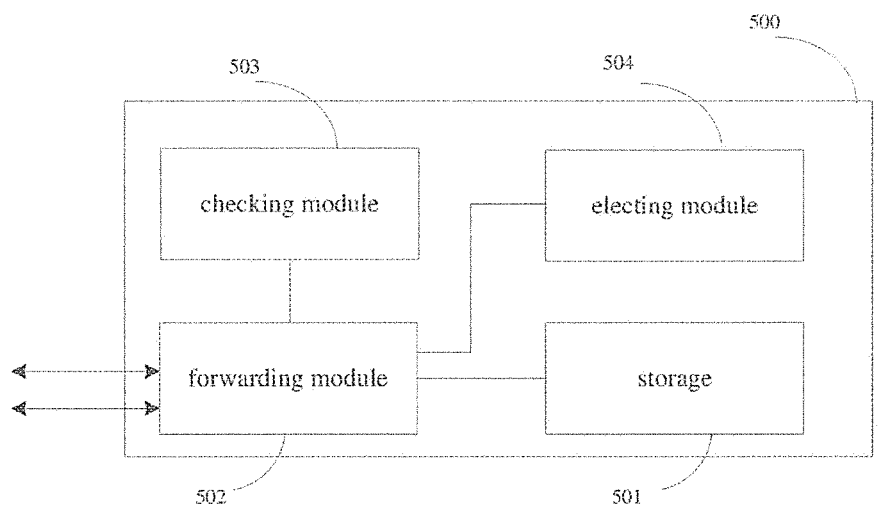
FIG. 5 is a diagram illustrating the structure of a packet forwarding apparatus according to another example of the present disclosure.

FIG. 5 is a diagram illustrating the structure of a packet forwarding apparatus according to another example of the present disclosure. The packet forwarding apparatus 500 may be applied to a gateway RB. VSIs of the gateway RB have different IP addresses, but have the same first local MAC address and the same second local MAC address or have different first local MAC addresses and different second local MAC addresses.

The packet forwarding apparatus 500 includes a storage 501, a forwarding module 502, a checking module 503 and a electing module 504.

The electing module 504 joins a virtual router, elects a master device of the the virtual router, and notifies the forwarding module 502 of a electing result.

The storage 501 may store learned ARP entries.

The forwarding module 502 may search for an ARP entry of the destination IP address of an IP packet in the ARP entries stored by the storage 501, and generate an Ethernet header according to a VLAN identification and a MAC address contained in the found ARP entry and a first local MAC address. The forwarding module 502 may generate an Ethernet packet by adding the Ethernet header to the IP packet to generate an Ethernet packet, and send out the Ethernet packet via an egress port in the ARP entry. A VSI associated with the first local MAC address and the destination IP address of the IP packet belong to the same VLAN.

In an example, when determining that the ARP entry of the destination IP address of the IP packet is not found, the forwarding module 502 may generate an ARP request packet for the destination IP address according to the local IP address and first MAC address of the VSI in response to determination that the ARP entry of the destination IP address of the IP packet is not found. The forwarding module 502 may encapsulate the ARP request packet into a TRILL-encapsulated ARP request packet and broadcast the TRILL-encapsulated ARP request packet. The forwarding module 502 may receive a TRILL-encapsulated ARP response packet corresponding to the destination IP address, and learn the ARP entry of the destination IP address based on an inner VLAN ID, a sender MAC address, a sender IP address in the received TRILL-encapsulated ARP response packet and a receiving port of the received TRILL-encapsulated ARP response packet.

In an example, the forwarding module 502 may further receive a TRILL-encapsulated ARP request packet for the IP address of a gateway, and learn an ARP entry of a sender IP address based on an inner VLAN ID, a sender MAC address, the sender IP address in the received TRILL-encapsulated ARP request packet and a receiving port of the received TRILL-encapsulated ARP request packet. The forwarding module 502 may generate an ARP response packet for the IP address of the gateway, and set the source MAC address of the generated ARP response packet as a second local MAC address of the VSI in a response to a determination that to respond to the ARP request packet for the MAC address of the gateway. The forwarding module 502 may encapsulate the generated ARP response packet into a TRILL-encapsulated ARP response packet and send the TRILL-encapsulated ARP response packet to the next-hop RB.

In an example, the checking module 503 may check a downlink and an uplink, and notify the forwarding module 502 of a failed downlink or a failed uplink. The forwarding module 502 may delete, from the storage 501, an ARP entry in which a port of the failed downlink is used as an egress port. When determining that all uplinks are failed, the forwarding module 502 may notify other RBs in the TRILL network of that all uplinks of the gateway RB are failed.

Figure 6:
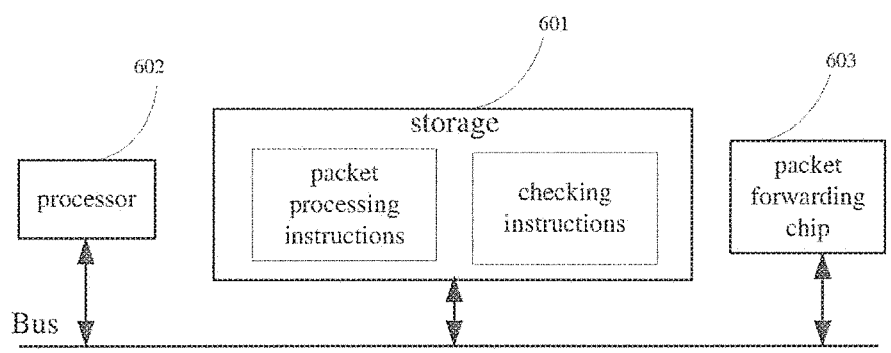
FIG. 6 is a diagram illustrating the structure of a packet forwarding apparatus according to another example of the present disclosure.

FIG. 6 is a diagram illustrating the structure of a packet forwarding apparatus according to another example of the present disclosure. The packet forwarding apparatus at least includes a storage 601, a processor 602 communicating with the storage 601 and a packet forwarding chip 603. The storage 601, the processor 602 and the packet forwarding chip 603 are connected via a bus. The storage 601 for example stores machine readable instructions that are executed to by the processor 602. The machine readable instructions for example include packet processing instructions. The storage 601 also store learned ARP entries. The storage 601 for example is a non-transitory computer storage readable medium.

The packet processing instructions may search for an ARP entry of the destination IP address of an IP packet in the ARP entries stored by the storage 601, and generate an Ethernet header according to a VLAN identification and a MAC address contained in the found ARP entry and a first local MAC address. The packet processing instructions may generate an Ethernet packet by adding the Ethernet header to the IP packet, and send out the Ethernet packet via an egress port in the ARP entry. A VSI associated with the first local MAC address and the destination IP address of the IP packet belong to the same VLAN.

In an example, the packet processing instructions may generate an ARP request packet for the destination IP address according to the local IP address and first local MAC address of the VSI in response to determination that the ARP entry of the destination IP address of the IP packet is not found. The packet processing instructions encapsulate the ARP request packet into a TRILL-encapsulated ARP request packet and broadcast the TRILL-encapsulated ARP request packet. The packet forwarding chip 603 may receive a TRILL-encapsulated ARP response packet corresponding to the destination IP address. The packet processing instructions learn the ARP entry of the destination IP address based on an inner VLAN ID, a sender MAC address, a sender IP address in the received TRILL-encapsulated ARP response packet and a receiving port of the received TRILL-encapsulated ARP response packet.

In an example, the packet forwarding chip 603 may further receive a TRILL-encapsulated ARP request packet for the IP address of a gateway. The packet processing instructions may learn an ARP entry of a sender IP address based on an inner VLAN ID, a sender MAC address, the sender IP address in the received TRILL-encapsulated ARP request packet and a receiving port of the received the TRILL-encapsulated ARP request packet. The packet processing instructions determine whether to respond to an ARP request packet for the MAC address of the gateway. The packet processing instructions generate an ARP response packet corresponding to the ARP request packet, and set the source MAC address of the generated ARP response packet as a second local MAC address of the VSI in a response to a determination that to respond to the ARP request packet for the MAC address of the gateway. The packet processing instructions encapsulate the generated ARP response packet into a TRILL-encapsulated ARP response packet and send the TRILL-encapsulated ARP response packet to the next-hop RB.

In an example, the storage 601 further includes checking instructions. The checking instructions may check a downlink and an uplink, and notify the packet processing instructions of a failed downlink or a failed uplink. The packet processing instructions may delete, from the storage 601, an ARP entry in which a port of the failed downlink is used as an egress. When determining that all uplinks are failed, the packet processing instructions may notify other RBs in the TRILL network of that all uplinks of the gateway RB are failed.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A packet forwarding method, comprising:
    searching for an Address Resolution Protocol (ARP) entry of the destination IP address of an IP packet;
    generating an Ethernet header based on a Virtual Local Access Network (VLAN) identification and a MAC address contained in the found ARP entry and a first local MAC address; wherein a Virtual Switching Interface (VSI) associated with the first local MAC address and the destination IP address of the IP packet belong to the same VLAN;
    adding the Ethernet header to the IP packet to generate an Ethernet packet, and sending out the Ethernet packet via an egress port in the ARP entry;
    when determining that the ARP entry of the destination IP of the IP packet is not found generating an ARP request packet for the destination IP address based on a local IP address and the first local MAC address of the VSI;
    encapsulating the ARP request packet into a TRILL-encapsulated ARP request packet and broadcasting the TRILL-encapsulated ARP request packet; and
    receiving a TRILL-encapsulated ARP response packet corresponding to the destination IP address, and learning the ARP entry, of the destination IP address based on an inner VLAN ID, a sender MAC address, and a sender IP address in the TRILL-encapsulated ARP response packet and a receiving port of the TRILL-encapsulated ARP response packet.

2. The packet forwarding method of claim 1, further comprising:
    receiving a TRILL-encapsulated ARP request packet for a IP address of a gateway;
    learning an ARP entry of a sender IP address in the TRILL-encapsulated ARP request packet based on an inner VLAN ID, a sender MAC address, and the sender IP address in the TRILL-encapsulated ARP request packet and a receiving port of TRILL-encapsulated ARP request packet;
    determining whether to respond to an ARP request packet for the MAC address of the gateway;
    when determining to respond to the ARP request packet for the MAC address of the gateway, generating an ARP response packet corresponding to the ARP request packet, and setting the source MAC address of the generated ARP response packet as a second local MAC address of the VSI; and encapsulating the generated ARP response packet into a TRILL-encapsulated ARP response packet and sending the TRILL-encapsulated ARP response packet to a next-hop Routing Bridge (RB).

3. The packet forwarding method of claim 1, further comprising:

checking a downlink; and when detecting a failed downlink, deleting an ARP entry in which a port on the failed downlink is used as an egress port.

4. The packet forwarding method of claim 1, further comprising:

checking an uplink; and when determining that all uplinks are failed, notifying other RBs in a TRILL network where a RB performing the packet forwarding method is located that all uplinks are failed.

5. A packet forwarding apparatus, comprising:

a storage, to store learned Address Resolution Protocol (ARP) entries;

a packet forwarding chip, to search for an ARP entry of the destination IP address of an IP packet in the ARP entries stored by the storage, generate an Ethernet header based on a Virtual Local Access Network (VLAN) identification and a MAC address in the found ARP entry and a first local MAC address, generate an Ethernet packet by adding the Ethernet header to the IP packet, and send out the Ethernet packet via an egress port in the ARP entry; wherein the ARP entry is learned based on a TRILL-encapsulated ARP packet; and a Virtual Switching Interface (VSI) associated with the first local MAC address and the destination IP address of the IP packet belong to the same VLAN;

generate an ARP request packet for the destination IP address based on a local IP address and the first local MAC address of the VSI in response to determining that the ARP entry of the destination IP address of the IP packet is not found;

encapsulate the ARP request packet into a TRILL-encapsulated ARP request packet and broadcast the TRILL-encapsulated ARP request packet;

receive a TRILL-encapsulated ARP response packet corresponding to the destination IP address, and learn the ARP entry of the destination IP address based on an inner VLAN ID a sender MAC address, and a sender IP address in the received TRILL-encapsulated ARP response packet and a receiving port of the received TRILL-encapsulated ARP response packet.

6. The packet forwarding apparatus of claim 5, wherein the packet forwarding chip is further to:

receive a TRILL-encapsulated ARP request packet for the IP address of a gateway;

learn an ARP entry of a sender IP address based on an inner VLAN ID, a sender MAC address, and the sender IP address in the received TRILL-encapsulated ARP request packet and a receiving port of the received TRILL-encapsulated ARP request packet;

determine whether to respond to an ARP request packet for the MAC address of the gateway;

generate an ARP response packet corresponding to the ARP request packet, and set the source MAC address of the generated ARP response packet as a second local MAC address of the VSI in response to a determination that responding to the ARP request packet for the MAC address of the gateway; and encapsulate the generated ARP response packet into a TRILL-encapsulated ARP response packet and send the TRILL-encapsulated ARP response packet to the next-hop RB.

7. The packet forwarding apparatus of claim 5 wherein the packet forwarding chip is further to:

check a downlink and an uplink, and notify the forwarding module of a failed downlink or a failed uplink; and the forwarding module is further to delete, from the storage, an ARP entry in which a port of the failed downlink is used as an egress port.

8. The packet forwarding apparatus of claim 5, wherein the packet forwarding chip is further to, notify other RBs in a TRILL network of that all uplinks o are failed in response to a determination that all uplinks are failed.

* * * * *